Patented Jan. 22, 1929.

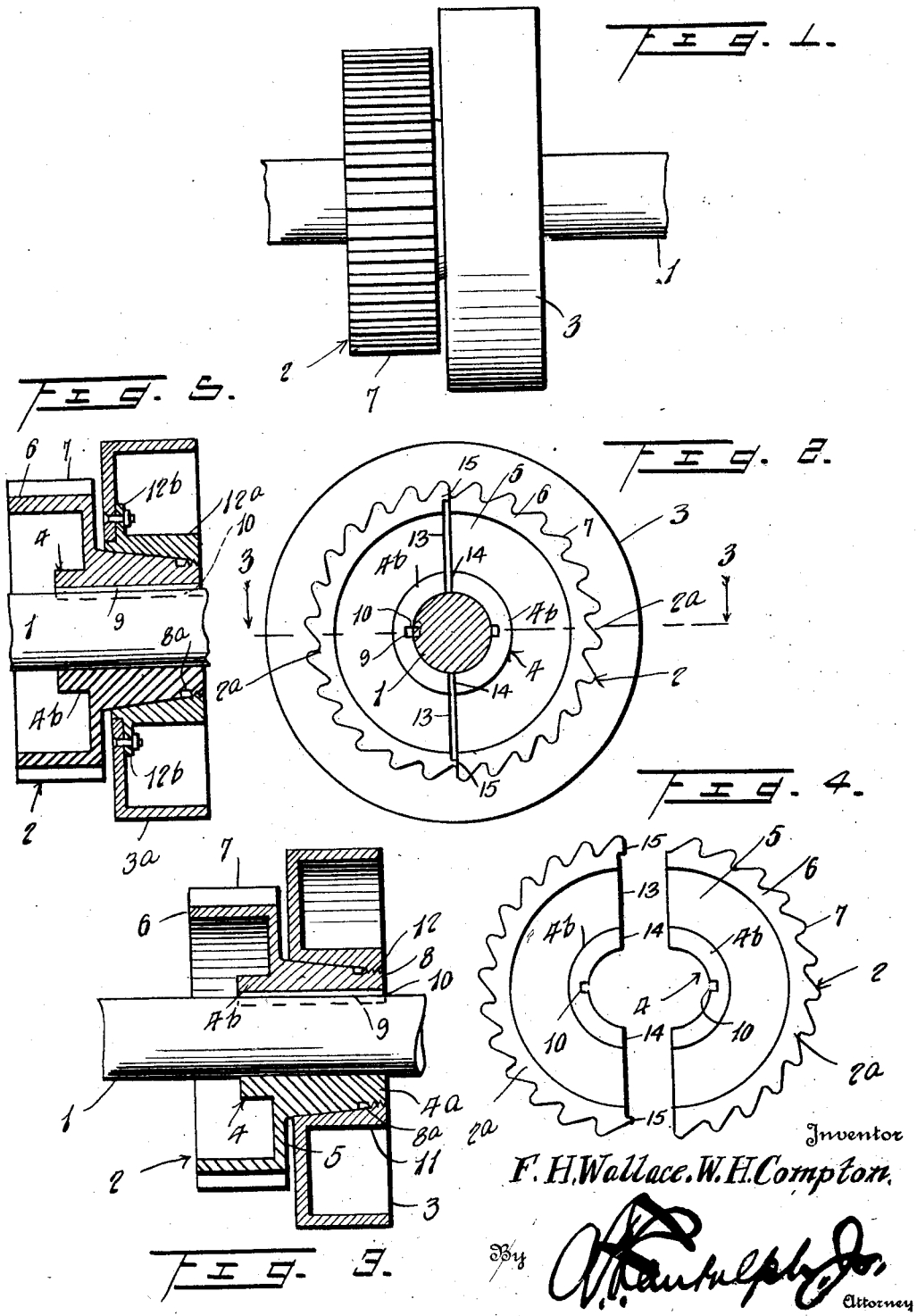

1,700,006

UNITED STATES PATENT OFFICE.

FRANK H. WALLACE AND WILLIAM H. COMPTON, OF NEWRY, SOUTH CAROLINA; SAID COMPTON ASSIGNOR TO CLAUDE CALLAS, OF NEWRY, SOUTH CAROLINA.

LOOM HEAD-GEAR AND PULLEY.

Application filed February 4, 1927. Serial No. 165,885.

This invention relates to head gears and driving pulleys for looms. In accordance with the present practice, the gears are bolted to the pulleys, and the pulleys are keyed to and have a driving fit on the crank shafts of the looms. As they are connected to the crank shafts through the medium of the pulleys, the gears tend to work out of alinement in a comparatively short time, and as the pulleys have a driving fit on the crank shafts, it is necessary when replacing a worm gear to first remove the crank shaft from the loom, then pull the gear and pulley off of the crank shaft, force the pulley equipped with the new gear back on the crank shaft, and thereafter replace the crank shaft and loom.

The invention has for one of its objects to overcome the stated objections to head gears and driving pulleys, and to attain this end comprehends the provision of a gear which shall be adapted to be keyed directly to the crank shaft and which may be easily and quickly applied and removed without first removing the crank shaft from the loom.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a view in front elevation of a head gear and driving pulley constructed in accordance with our invention, the gear and pulley being shown applied to the crank shaft of a loom, Figure 2 is a view in side elevation of the head gear and driving pulley, the crank shaft being in vertical section, Figure 3 is a sectional view taken on the plane indicated by the line 3—3 of Figure 2, Figure 4 is a detail view in side elevation of the head gear, and Figure 5 is a sectional view illustrating a slightly modified form of the invention.

In the drawing, 1 designates a fragmentary portion of the drive shaft, 2 the head gear, and 3 the driving pulley of a loom.

The head gear comprises a hub 4, web 5, rim 6 and teeth 7. The teeth 7 may be of any shape and number, and if desired spokes may be substituted for the web 5 and the web or spokes placed at one edge or within the center of the rim 6. The hub 4 has a cylindrical bore and projects inwardly and outwardly beyond the web 5, and the outer portion 4$^a$ thereof has a conical outer surface. The outer extremity of the outer hub portion 4$^a$ is cylindrical and screw threaded as shown at 8, and said hub portion is provided with an annular groove 8$^a$ situated immediately inward of the outer cylindrical end 8. The inner portion 4$^b$ of the hub 4 is located wholly within the plane of the rim 6. The head gear 2 is of sectional formation, and the sections 2$^a$ thereof are similar. The hub 4 has a snug fit on the crank shaft 1, and is secured to the crank shaft for rotation therewith by a key 9 for the reception of which the hub 4 is provided with grooves 10. The inner diameter of the hub 4 is slightly less than the diameter of the shaft 1 so as to permit the pulley sections 2$^a$ to be tightened on the shaft should the latter wear and to permit them to be firmly secured on a worn shaft.

The driving pulley 3 is provided with a hub 11 which has a conical bore for the reception of the hub portion 4$^a$ of the head gear 2 and is provided with an inner cylindrical screw threaded portion 12 for engagement with the screw threaded portion 8 of the hub portion 4$^a$. The hub 11 has a snug fit on the hub portion 4$^a$, and is held thereon by the screw threads of the portions 8 and 12. The driving pulley 3 holds the head gear sections 2$^a$ in assembled relation on the crank shaft 1, and to prevent the accidental separation of the head gear and driving pulley during the operation of the loom the threads of the portions 8 and 12 run in the direction of the rotation of the head gear and driving pulley. The threads of the portions 8 and 12 may be of any pitch, and the length of the hub portion 4$^a$ is greater than that of the hub 11.

As the head gear 2 is of sectional formation, and as the driving pulley 3 secures the hub sections 2$^a$ in assembled relation on the crank shaft 1, the head gear may be removed and a new one substituted therefor without removing the crank shaft from the loom, and this may be done in a comparatively short time and at the expenditure of comparatively little labor. To remove the head gear 2, it is only necessary to first remove the driving pulley 3 from the hub portion 4$^a$, and then remove first one and then the other head gear sections 2$^a$. After the new gear has been placed upon the crank shaft 1 to lock the same thereon it is only necessary to connect the driving pulley 3 with the hub portion 4ᵃ thereof. As the head gear 2 bears directly upon the crank shaft 1, and is held tightly thereon by the driving pulley 3, it is impossible for it to work out of alinement. The hub portion 4ᵇ is adapted to contact with the brake or hand wheel of the loom.

One section 2ᵃ of gear 2 is recessed as shown at 13 and the portion of hub 4 of the corresponding section is cut away as shown at 14 thus making the total inner circumference of the two hub portions slightly less than the circumference of the shaft 1, thus providing for an intimate contact of the hub 4 with the shaft to compensate for wear of the shaft or hub. Furthermore the threads 8 and 12 on hubs 4 and 11 run in the direction of rotation of pulley 3 so that the engagement of hub 4 on shaft 1 will be an intimate engagement at all times occasioned by the pull of the belt (not shown) trained on the pulley 3. The annular groove 8ᵃ at the base of threads 8 provides a clearance for threads 12 in running up on threads 8.

The two sections 2ᵃ of gear 2 have their respective hub portions provided with a key slot 10 so that the sections 2ᵃ may be interchangeably engaged with the key 9 to insure a satisfactory installation of the gear 2 on the shaft 1. Furthermore by constructing gear 2 in sections provision is made by which a broken or imperfect section may be replaced and repair made at a reduced expenditure of time and labor.

The projections 15 formed by the recesses 13 by reducing the bearing surfaces of the sections of gear 2 insure a satisfactory assembling of the gear sections.

As shown in Figure 5, provision is made for supplying pulleys now in use with hubs that will adapt them for use in connection with the gear 2, and to attain this end a hub 12ᵃ, which is similar to the hub 11, is provided with a flange 12ᵇ to permit it to be bolted to the pulley 3ᵃ after the removal of the original hub thereof.

It should be understood that the drawing is merely illustrative and does not pretend to give exact proportions. Furthermore, the said drawing is illustrative of a preferred construction, it being our expectation that various changes and modifications may be made without departing from the spirit and scope of our invention.

What is claimed is:—

In combination, a drive shaft, a sectional gear mounted thereon, provided with a conical hub projecting beyond one side thereof and having a bore to receive the shaft, one section of the gear being recessed and the hub portion thereof cut away, making the total inner circumference of the sectional hub less than the circumference of the shaft, the outer end of the sectional hub being cylindrical and externally threaded and provided with an annular groove at the inner end of the thread, means connecting the shaft and one of the hub sections for simultaneous rotation, and a one piece member shorter than the hub and having a conical bore receiving the hub and securing the gear and hub sections in assembled relation on the shaft, said member having an inner cylindrical threaded portion engaging the threads on the hub.

In testimony whereof we affix our signatures.

FRANK H. WALLACE.
WILLIAM H. COMPTON.